Figure 1:
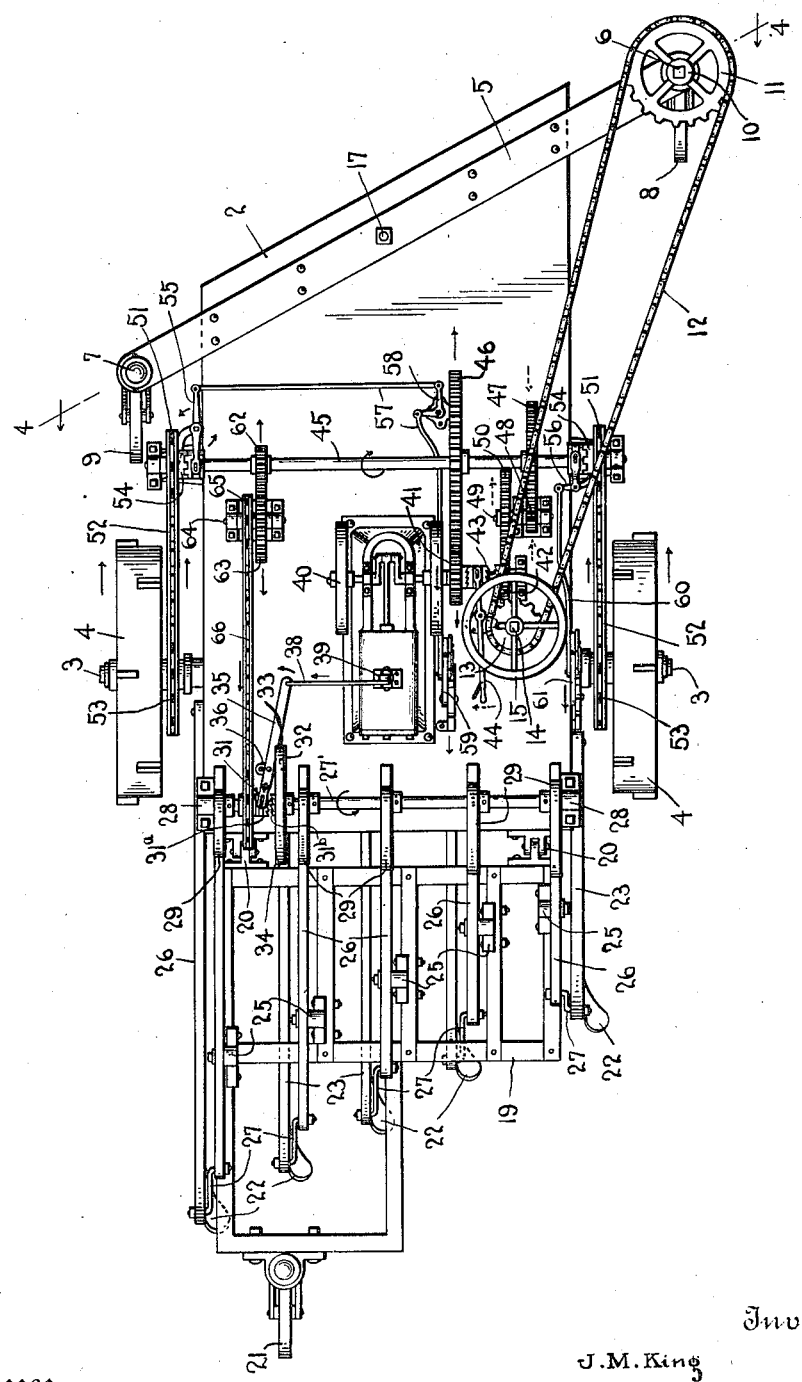

J. M. KING.
STEERING MECHANISM FOR MOTOR OPERATED GANG PLOWS.
APPLICATION FILED MAR. 30, 1911.

1,033,708.

Patented July 23, 1912.

3 SHEETS—SHEET 1.

Witnesses
L. B. James
O. B. Hopkins

Inventor
J. M. King
by H. B. Willson &co.
Attorneys

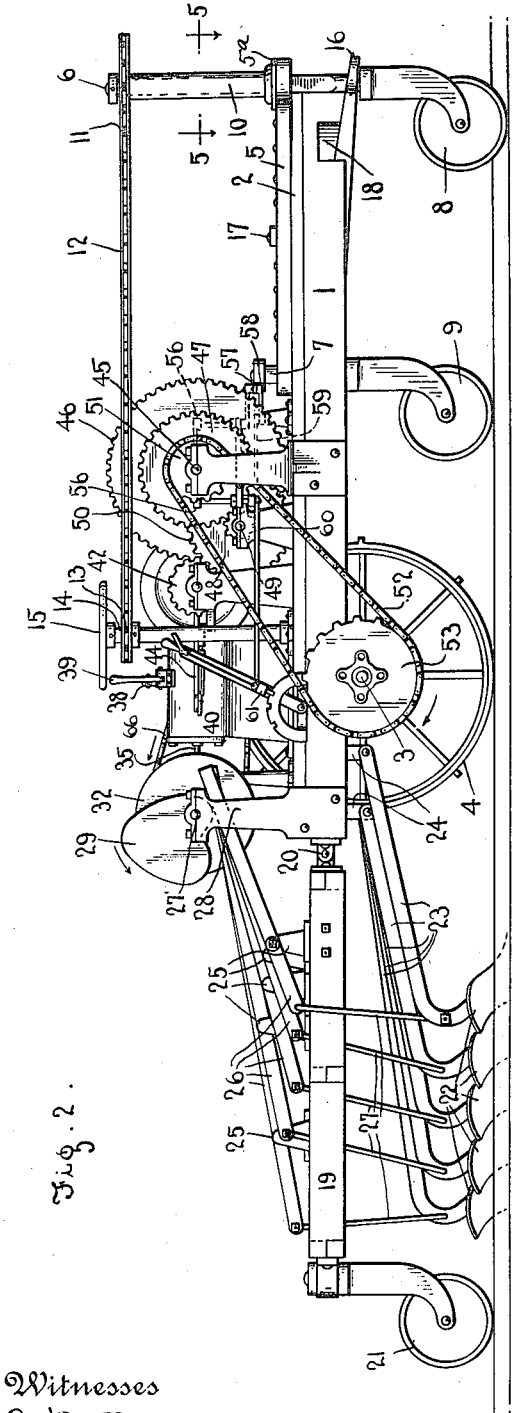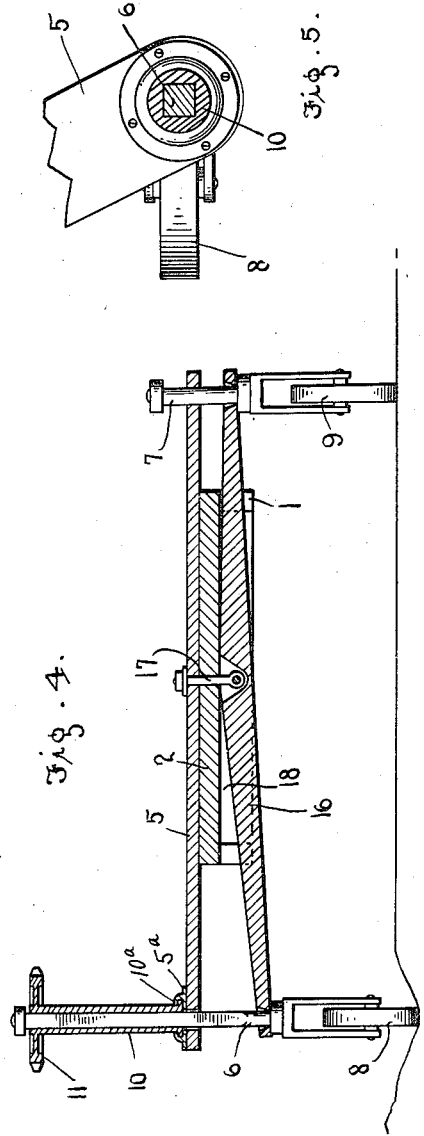

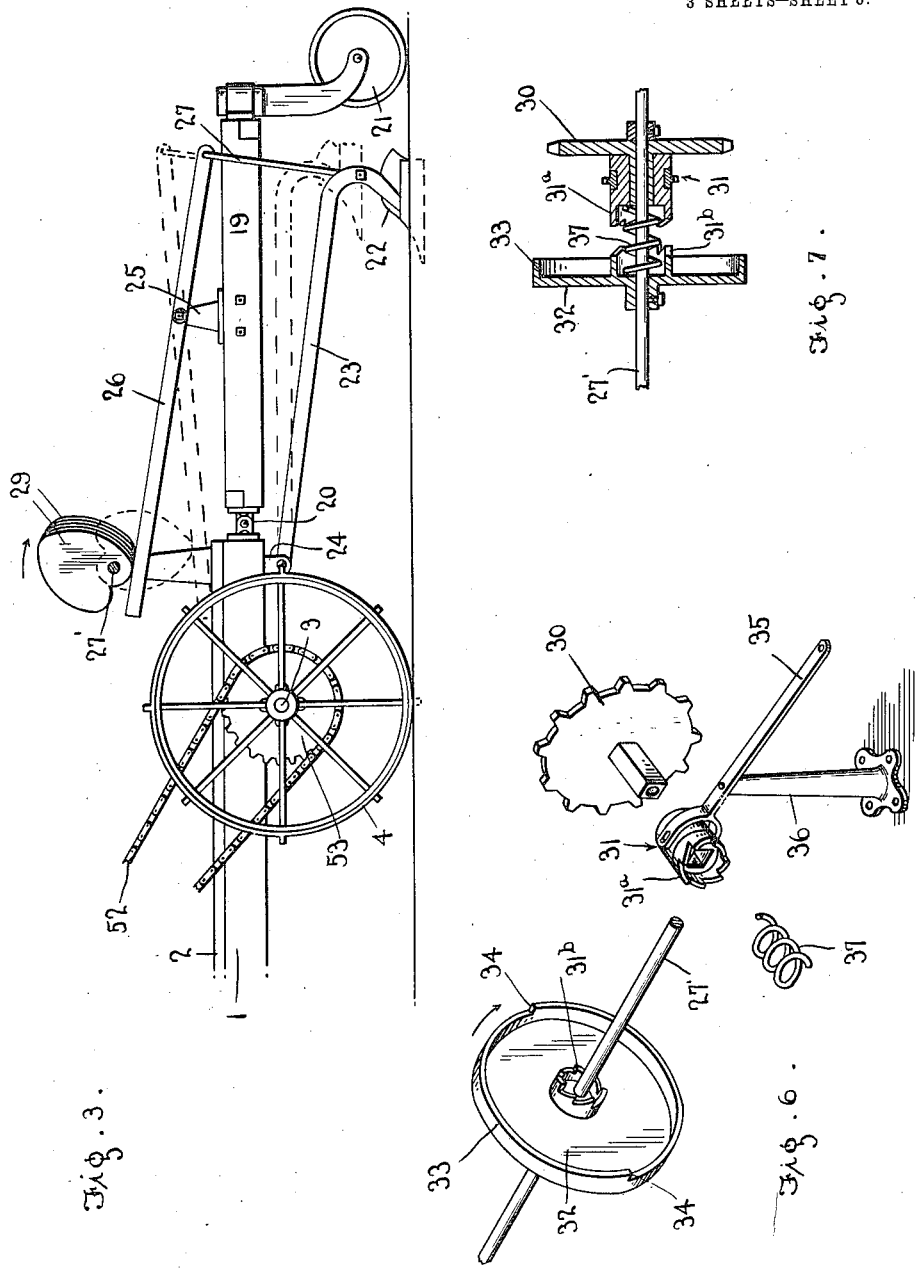

UNITED STATES PATENT OFFICE.

JAMES MOSES KING, OF FRAZEE, MINNESOTA.

STEERING MECHANISM FOR MOTOR-OPERATED GANG-PLOWS.

1,033,708.

Specification of Letters Patent. Patented July 23, 1912.

Application filed March 30, 1911. Serial No. 617,942.

*To all whom it may concern:*

Be it known that I, JAMES MOSES KING, a citizen of the United States, residing at Frazee, in the county of Becker and State of Minnesota, have invented certain new and useful Improvements in Steering Mechanism for Motor-Operated Gang-Plows; and I do declare the following to be a full, clear, and exact description of the invention, such as will enable others skilled in the art to which it appertains to make and use the same.

This invention relates to improvements in steering mechanism for motor operated gang plows.

One object of the invention is to provide a gang plow having an improved construction of automatic steering mechanism whereby the machine is caused to travel parallel with the furrows which have been previously plowed.

With this and other objects in view the invention consists of certain novel features of construction, combination and arrangement of parts as will be more fully described and particularly pointed out in the appended claims.

In the accompanying drawings: Figure 1 is a plan view of my improved plow; Fig. 2 is a side of the same; Fig. 3 is a vertical longitudinal section of the rear portion of the machine; Fig. 4 is a vertical cross section through the front end of the machine and the steering mechanism taken on the line 4—4 of Fig. 1; Fig. 5 is a detail horizontal sectional view taken on the line 5—5 of Fig. 2; Fig. 6 is a detail perspective view of the driving and clutch mechanism for the plow lifting devices showing the parts of the same separated; Fig. 7 is a detail sectional view through said parts.

Referring more particularly to the drawings 1 denotes the main supporting frame of the plow, said frame having arranged thereon a platform 2. The rear portion of the frame is supported on an axle 3 on the outer ends of which are loosely mounted supporting wheels 4.

Secured to the forward end of the platform 2 is a diagonally arranged cross bar 5 in the outer ends of which are slidably mounted the standards 6 and 7 of front supporting or caster wheels 8 and 9. The standard 6 of the wheel 8 has a squared upper portion which works loosely through an opening in the cross bar 5 and extends a suitable distance above said platform and is slidably engaged with a steering sleeve 10 the lower end of which is revolubly secured to the end of the bar 5 in any suitable manner as by having a flange 10ª swiveled in the collar 5ª as shown in Fig. 4. On the upper end of the sleeve 10 is fixed a sprocket gear 11 which is connected by a sprocket chain 12 to a sprocket gear 13 fixed on a steering post 14 mounted in suitable bearings on the platform of the plow as shown. On the upper end of the post 14 is fixed a steering wheel 15 whereby the steering mechanism is operated to turn the steering wheel 8. By extending the standard of the wheel 8 and mounting the same to slide vertically it will be readily seen that the wheel is allowed to travel in the furrow while the body of the machine is maintained in a level position.

It will be noted that the end of the cross bar 5 in which the standard of the wheel 8 is arranged projects a suitable distance beyond the side of the machine to permit said wheel to drop down and travel in the last furrow formed by the plow, thus guiding or keeping the machine in line to form the successive furrows parallel with those previously plowed. In order to hold the wheel 8 down into engagement with the furrow I preferably provide a lever 16 which is pivoted intermediate its ends to an eye bolt 17 passed through the bar 5 and adjacent portion of the platform as shown. The lever 16 is disposed on an oblique line across the frame and lies immediately below or in line with the diagonal cross bar 5 and works in a diagonally arranged guide-way 18 formed in the frame 1 as shown. The ends of the lever are loosely engaged with the standards 6 and 7 of the wheels 8 and 9 and bear on the upper ends of the forks of said wheels as shown. By thus arranging the lever it will be seen that, when the wheel 8 is in a furrow and the opposite wheel 9 on hard ground, said lever will be rocked and the end of the same which engages the fork of the wheel 8 will hold the latter down in the furrow by the weight of the machine on the lever and the engagement of the opposite end thereof with the fork of the wheel 9 which acts as a fulcrum.

The numeral 19 designates a plow supporting frame the forward end of which is hingedly connected to the rear end of the frame 1 by a suitable hinge 20. The rear end of the frame 19 is supported by a caster wheel 21 the standard of which is pivotally connected with the frame 19 as shown. Beneath the frame 19 are a series of plows 22 the beams 23 of which are pivotally connected at their forward ends to suitable hangers or brackets 24 arranged on the rear end of the main frame as shown. Arranged on the frame 19 are a series of bearing brackets 25 to which are pivotally connected a series of plowing levers the outer ends of which are loosely connected by hanger bars or rods 27 to the outer ends of the plow beams as shown.

In order to raise and lower the plows out of and into engagement with the ground, I provide a suitable lifting mechanism comprising a rock shaft 27' mounted in suitable bearing standards 28 across the rear end of the main frame 1, and on this shaft a series of cams 29 each of which is adapted to engage the forward end of one of the plow operating levers 26. The cams 29 gradually increase in size from one side of the machine to the other so that when the shaft is rocked, said cams will be successively brought into engagement with the levers 26 thus successively raising the plows out of the ground. By thus arranging the plow lifting mechanism it will be seen that but one plow is lifted at a time so that the excessive strain which would result if all the plows were lifted at once is obviated.

The shaft 27' is turned by a suitable operating mechanism comprising a sprocket gear 30 which is loosely mounted on the shaft and is operatively engaged therewith by a clutch device 31 one member 31ᵃ of which is engaged with the squared hub of the gear 30 while the other member 31ᵇ is formed on or connected to a locking disk 32 fixedly mounted on the shaft 27' and having on its outer edge an annular flange 33 in which at diametrically opposite points are formed stop notches 34. With the clutch member forming part of the gear 30 is operatively connected one end of a shifting clutch lever 35 which is pivoted on a suitable standard 36 secured to the platform of the machine and extends across the flange 33. Between the clutch members is arranged a coiled spring 37 whereby said members of the clutch are normally held apart. The outer end of the lever is connected by an operating rod 38 to a suitably mounted operating lever 39 whereby the clutch member 31ᵃ on the hub of the gear 30 may be thrown into engagement with the clutch member 31ᵇ on the disk 32 against the pressure of said spring 37. The cams 29 on the shaft 27 are so arranged with respect to the notches 34 in the flange 33 of the disk 32 that when the plows are in a lowered or operative position and the clutch members separated, one or the other of the notches will engage the clutch shifting lever 35 thereby forming a stop which will prevent the revolution of the shaft 27' and the cams until the clutch shifting lever is moved by hand to throw the clutch members together and thus connect the gear 30 with the shaft to turn the cams and thereby rock the levers 26 and lift the plows.

On the platform 2 of the machine is arranged a motor 40 which may be of any suitable style or construction and is here shown in the form of a gas engine. On the drive shaft of the engine are loosely mounted power transmitting gears 41 and 42 said gears being provided with clutch members adapted to be engaged by a double faced clutch 43 which is slidably keyed to the engine shaft and provided with a suitable shifting lever 44 whereby the same may be shifted to engage either one or the other of the gears 41 or 42 thus locking the same to the engine shaft.

Revolubly mounted in suitable bearings on the platform of the machine is a power transmitting shaft 45 on which is fixedly mounted a spur gear 46. The gear 46 is in operative engagement with the gear 41 on the engine shaft whereby when said gear 41 is locked to the engine shaft the shaft 45 will be driven in one direction. Also mounted on the shaft 45 is a spur gear 47 which is engaged with a pinion 48 on a short counter-shaft 49 on which is also fixedly mounted a gear 50. The gear 50 is in operative engagement with the gear 42 on the engine shaft whereby when the clutch 43 is shifted into engagement with said gear the shaft 45 will be driven in a reverse direction.

On the outer ends of the power shaft 45 are loosely mounted driving sprockets 51 which are connected by sprocket chains 52 to sprocket gears 53 on the supporting wheels 4 of the machine. The driving sprockets 51 have formed thereon one member of clutches 54 the opposing members of which are slidably keyed to the shaft 45 and are adapted to be shifted into and out of engagement with the clutch members of the sprockets by shifting levers 55 and 56. The shifting lever 55 is connected by suitable operating rods 57 and a bell crank lever 58 with an operating lever 59 whereby the driving sprocket on one side of the machine is locked to the shaft 45 and thus drives the supporting wheel connected thereto. The shifting lever 56 on the opposite side of the machine is connected by an operating rod 60 to an operating lever 61 whereby the clutch on this side of the machine is operated to lock this driving sprocket to the shaft 45 whereby the supporting wheel connected to this sprocket is driven. By thus arranging the clutch devices 54 it will be seen that the driving mechanism for either or both of the supporting wheels may be thrown into or out of gear when desired. It will also be seen that by means of the reversing mechanism for the shaft 45 that the latter may be connected with the drive shaft of the engine to propel the machine forwardly or rearwardly.

On the shaft 45 is fixedly mounted a spur gear 62 which is in operative engagement with a similar gear 63 fixed on a countershaft 64 revolubly mounted in suitable bearings on the platform of the machine. On the shaft 64 is also fixedly mounted a sprocket gear 65 which is connected by a sprocket chain 66 to the sprocket gear 30 on the cam operating shaft 27 whereby when said sprocket 30 is locked to said shaft the latter will be driven by the power transmitting shaft 45 to raise and lower the plows as hereinbefore described.

From the foregoing description taken in connection with the accompanying drawings the construction and operation of the invention will be readily understood without requiring a more extended explanation.

Various changes in the form, proportion and the minor details of construction may be resorted to without departing from the principle or sacrificing any of the advantages of the invention as defined in the appended claims.

Having thus described my invention what I claim is:

1. A plow of the character described including a wheeled supporting frame, and a steering mechanism arranged on the front end of the machine, said mechanism comprising an obliquely disposed supporting bar, caster wheel standards slidably mounted in the opposite ends of said bar, caster wheels operatively mounted on the lower ends of said standards, one of said standards being extended to permit the caster wheel thereon to travel in a furrow without tilting the machine, a lever pivotally mounted in the frame of the machine and having a loose engagement with the standards of said caster wheels whereby the weight of the machine will hold one of said wheels in the furrow, a steering sleeve revolubly mounted on said wheel supporting bar and having a sliding engagement with the extended shank of one of said caster wheels, a sprocket gear fixed on said sleeve, a steering post arranged on the machine, a sprocket gear connected to said post, a sprocket chain connecting said gears, and a hand wheel mounted on said steering post and operatively engaged with the sprocket gear thereon.

2. In a motor operated gang plow of the class described, the combination with the wheeled supporting frame, means for propelling it, of a bar across said frame having upright openings at its extremities, a lever centrally pivoted beneath said frame and having similar openings at its extremities, a caster-wheel whose shank is journaled through the openings at one end of said bar and lever, a second caster wheel whose standard is similarly mounted in the openings at the other ends thereof and is made angular in cross section and extended above said bar, a sleeve revolubly mounted on said bar and in which the angular extension of the standard slides, this caster wheel being disposed to one side of the nearest main supporting wheel and adapted to travel in one of the previously formed furrows, a steering wheel, and connections between said steering wheel and sleeve for permitting the latter to be turned.

3. In a motor operated gang plow of the class described, the combination with the wheeled supporting frame, of a bar across said frame having upright openings at its extremities, a lever centrally pivoted beneath said frame and having similar openings at its extremities, a caster wheel whose shank is journaled through the openings at one end of said bar and lever, a second caster wheel whose standard is similarly mounted in the openings at the other ends thereof and is extended above said bar and made angular in cross section, a collar mounted on said bar, a sleeve slidably mounted on the angular extension of said standard and having a flange revolubly engaging said collar, the caster wheel of this standard being disposed to one side of the nearest main supporting wheel and adapted to travel in one of the previously formed furrows, a steering wheel, and connections between said steering wheel and sleeve for permitting the latter to be turned.

4. In a plow of the class described, the combination with the wheeled supporting frame having a diagonal guide-way across its front end, of a cross bar secured upon the frame and extending obliquely across it above said guide-way, a rocking lever mounted within said guide-way and its ends extending beyond the sides of the frame and beneath the ends of said cross bar, a caster wheel traveling on the unplowed ground and having its standard journaled in one end of said lever and the corresponding end of said bar, a second caster wheel traveling in the previously formed furrow and having its standard journaled through the other end of said lever and the corresponding end of the bar and rising above the same, a sprocket gear connected with its upper end, a steering wheel, and connections between said gear and steering wheel, for the purpose set forth.

5. In a plow of the class described, the combination with the wheeled supporting frame having a diagonal guide-way across its front end; of a rocking lever mounted within said guide-way and its ends extending beyond the sides of the frame, a caster wheel traveling on the unplowed ground and having its standard journaled in one end of said lever, a second caster wheel traveling in the previously formed furrow and having its standard journaled through the other end of said lever and rising above the same, a sprocket gear connected with its upper end, a steering wheel, and connections between said gear and steering wheel, for the purpose set forth.

In testimony whereof I have hereunto set my hand in presence of two subscribing witnesses.

JAMES MOSES KING.

Witnesses:
L. W. OBERHAUSER,
WM. ESPENSON.